United States Patent [19]

Koval et al.

[11] 4,146,210
[45] Mar. 27, 1979

[54] HOIST ELECTRIC BRAKE WITH SHADING COIL

[75] Inventors: Edmund R. Koval, Tonawanda; Kenneth D. Schreyer, Clarence, both of N.Y.

[73] Assignee: Columbus McKinnon Corporation, Tonawanda, N.Y.

[21] Appl. No.: 825,596

[22] Filed: Aug. 18, 1977

[51] Int. Cl.² .................................................. B66D 5/30
[52] U.S. Cl. ...................... 254/186 R; 188/171; 310/93; 310/172; 336/73; 336/172
[58] Field of Search .................. 254/186 R, 187 G; 188/171; 336/73, 172; 310/93, 172, 92

[56] References Cited

U.S. PATENT DOCUMENTS

| | | | |
|---|---|---|---|
| 1,364,857 | 1/1921 | Hall | 336/172 X |
| 1,722,167 | 7/1929 | Wilson | 336/73 |
| 1,917,289 | 7/1933 | Benson | 336/73 X |
| 2,284,406 | 5/1942 | D'Entremont | 336/73 |
| 2,406,045 | 8/1946 | Stevens | 336/73 |
| 2,445,408 | 7/1948 | Root | 336/73 |

OTHER PUBLICATIONS

Abstract of application 732,605 filed Mar. 5, 1947 and published Mar. 13, 1951 (Pole Shades).

*Primary Examiner*—Trygve M. Blix
*Assistant Examiner*—Jerold M. Forsberg
*Attorney, Agent, or Firm*—Bean, Kauffman & Bean

[57] ABSTRACT

A hoist brake unit having a shading coil mechanically locked into the core of the brake unit's electromagnet. The mechanical lock is achieved by passing the coil through a cavity in the core having intervening core material between the cavity and an external surface of the core.

11 Claims, 7 Drawing Figures

HOIST ELECTRIC BRAKE WITH SHADING COIL

BACKGROUND OF THE INVENTION

1. Field of the Invention

The present invention relates to shading coil and core designs of an electromagnetic pole. More specifically, the invention relates to shading coil and core designs of electromagnets used in electric brakes in hoists.

2. The Prior Art

Shading coils have been used in the past to influence the phase angle of the magnetic field of the encircled portion of a pole of an electromagnet. In electric brakes, where a brake plate is held against the force of a spring by an electromagnet excited by an alternating current, shading coils have been used to prevent the momentary total collapse of the magnetic force as the current is reversing. If the collapse of the magnetic field were not prevented, the brake parts would undergo an undesirable chatter at a frequency equal to twice the frequency of the alternating current.

The prior art shading coil has conventionally been pressed into slots formed across the face of the magnetic pole. In some cases. One leg of the loop of the shading coil would complete the circuit around the outside of the pole. While of simple construction, this design had the difficulty that the coil would loosen and eventually fall out as the result of brake cycling between on and off positions. Repair would require pressing a new coil into the slots in the pole face with special pressing and staking equipment. Such repairs may require shipping the hoist back to the plant for repair. Additionally, repair was only of a temporary nature, however, since the new coil would also eventually loosen and would require replacement. Each successive replacement would have a shorter lifetime since each successive replacement would cause the smoothing of the retention surfaces thereby weakening their holding ability.

Thus, it may be appreciated that a more reliable and consequently less expensive design for shading coils in hoist brake units is desirable. Such a design has been provided by the present invention.

SUMMARY OF THE INVENTION

An improved hoist is provided with shading coil and magnetic pole design which effectively prevents the chatter in a hoist brake solenoid assembly by providing a residual force to hold the armature and field together during the period where the the alternating current flowing through the brake coil is close to zero. The improved hoist is of the type having a motor for rotationally driving a shaft and an electrically operated brake unit for impeding the rotation of the shaft. The brake unit includes a friction plate rotatably attached to the shaft and a rotationally stationary, axially moveable brake plate adapted to engage the friction plate. The brake plate has attached thereto a magnetically attractable armature. The brake plate and the friction plate are normally urged into frictional contact by means of compressive springs. This compressive force may be overcome by an electromagnet operating on the armature attached to the brake plate, thereby releasing the brake and permitting the hoist drive shaft to rotate.

The core of the electromagnet includes a paramagnetic material having at least one pole with a pole face. The shading coil of the present invention encircles a portion of the pole at a position close to the pole face but submerged in the core material. Thus, the core includes a cavity formed within the core through which the shading coil passes. The cavity has at least a portion thereof separated from the pole face by an intervening portion of the core. It is this intervening portion of core material which physically locks the shading coil into the pole and prevents the coil from falling out.

In one embodiment, the coil penetrates through the core by passing through two subsurface passages. In another case the coil completes the circuit loop by passing around the outside of the core. In another embodiment, a channel is formed into the side of the core and the coil passes successively through this side channel and through a slot extending into the core from the pole face or through a tunnel passage passing through the core. The preferred embodiment includes a pair of tunnels passing through the core from one side to the other with the circuit loop passing successively through these tunnels. In each of these embodiments, the shading coil is physically retained in its desired position by the presence of core material intermediate to the coil and the pole face. Such shading coils are easy to install by simply slipping them into the appropriate cavities in the core material and then welding, soldering, twisting or otherwise fastening the ends together.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE PREFERRED EMBODIMENT

Figure 1:
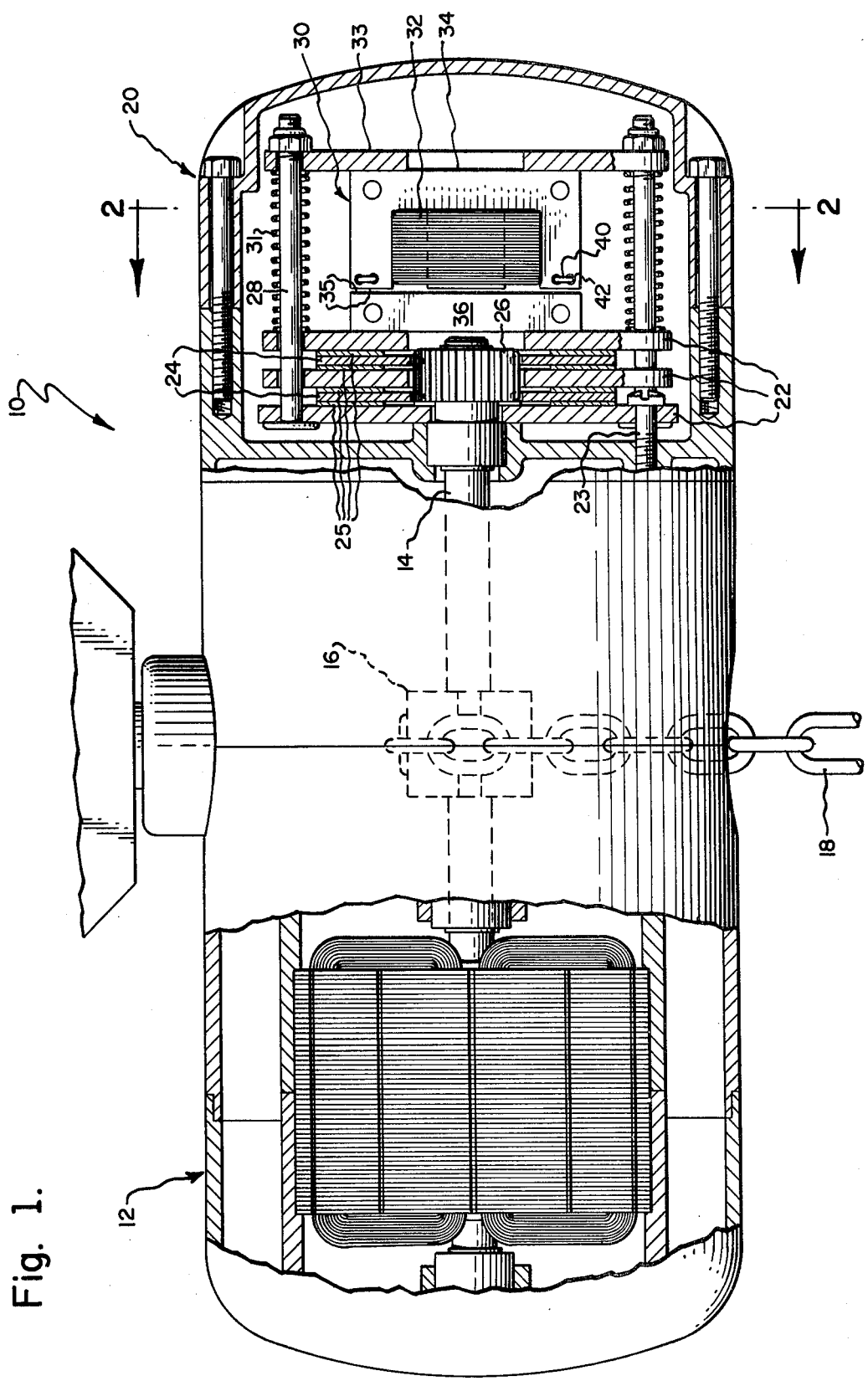
FIG. 1 is a side elevation of a chain hoist having a braking unit.

A typical hoist 10 is shown in FIG. 1 including a motor 12, a drive shaft 14, a chain lift wheel 16 over which is trained a chain 18, and a brake unit 20 adapted to engage and arrest the rotational movement of drive shaft 14. Brake unit 20 includes friction plates 24 with friction material 25 thereon. Friction plates 24 are disks formed with a central toothed opening which engages hub 26 mounted on the end of the drive shaft 14. With this arrangement, friction plates 24 are constrained to move rotationally with the drive shaft 14 but are permitted a degree of axial movement parallel to the axis of the drive shaft 14.

The brake unit 20 further includes brake plates 22 interleaved between friction plates 24 in a manner such that friction plates 24 are squeezed between the brake plates 22 when the brake plates 22 are urged together. Bolts 23 which engage a portion of the housing of the hoist are provided to prevent the brake plates 22 from rotating. Studs 28 string the plurality of brake plates 22 together and connect the brake plates 22 with a mounting plate 33. Brake springs 31 are mounted on the studs 28 and are compressed between the outermost brake plate 22 and the mounting plate 33. In this manner, brake plates 22 are continuously urged together to come into friction contact with the friction surfaces 25 of the friction plates 24 to impede the rotational motion of the drive shaft 14 and thereby to halt the lifting action of the chain wheel 16 and the chain 18.

Electromagnet 30 comprising electrical coil 32 and E-shaped core 34 are provided mounted on mounting plate 33 for the purpose of releasing the brake unit and permitting the hoist to drive. When electromagnet 30 is energized, armature 36 is attracted to the right, thereby drawing the rightmost brake plate 22 also to the right since armature 36 is attached to the plate. Accordingly, electromagnet 30 compresses the springs 31 to release the binding pressure on the friction plates 24. This arrangement is such that if the electrical power to the hoist were to fail, the electromagnet 30 would release its magnetic attraction for armature 36 so that the springs 31 would once again be permitted to force the brake plates 22 together to halt the rotation of the friction plates 24 and the shaft 14.

As previously discussed, it has been known in the prior art to provide the poles of electromagnetic core 34 or the poles of the armature 36 with shading coils in order to eliminate the chatter that arises in such a braking unit as a result of the alternating current which energizes the electromagnet 30. Such prior art shading coils were slipped into slots of the poles of either the armature or of the core and would subsequently loosen due to the repetitive opening and closing of the brake unit. The present invention avoids this problem by physically locking the shading coil 40 into the pole of the paramagnetic core by passing the shading coil 40 through a cavity or passage 42 formed in the core or armature.

Figure 3:
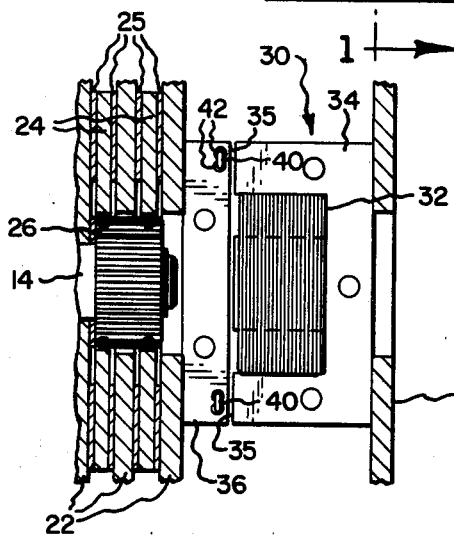
FIG. 3 is a side elevation similar to that of FIG. 1 and showing the shading coil on the armature rather than on the core of the electromagnet.

FIG. 3 illustrates a brake unit in which the shading coil 40 is positioned in the armature 36 in such a manner that the shading coil links a portion of the lines of force which are concentrated within the armature by the paramagnetic material of the armature. In the arrangement shown, the shading coil 40 passes through two cavities or passages 42 formed within the armature 36 a short distance under the surface of the armature which acts as a pole face.

Figure 2:
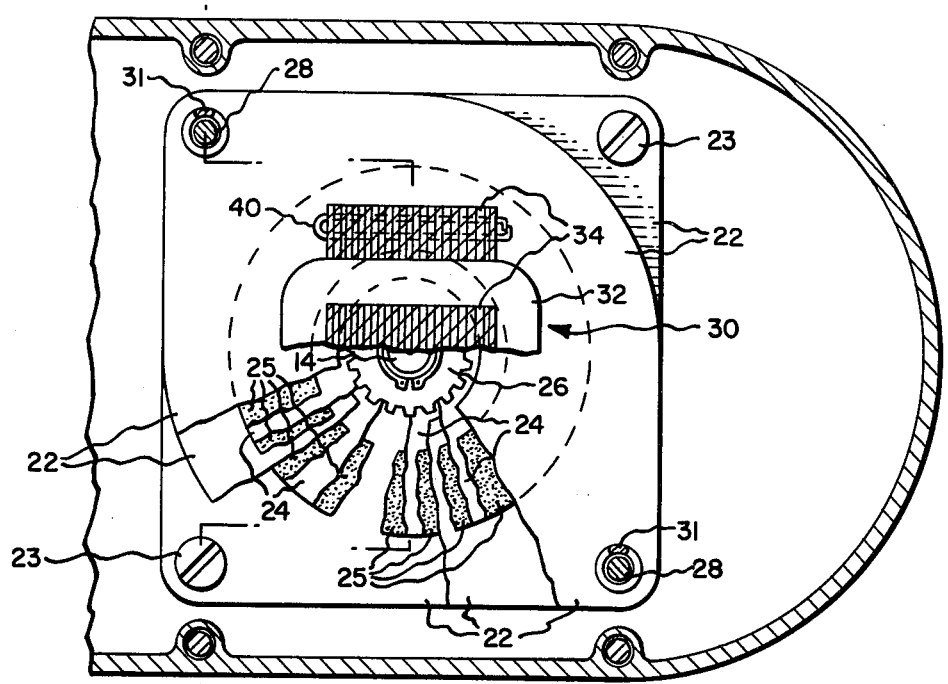
FIG. 2 is a view of the braking unit of FIG. 1 taken along the lines 2—2.
Figure 4:
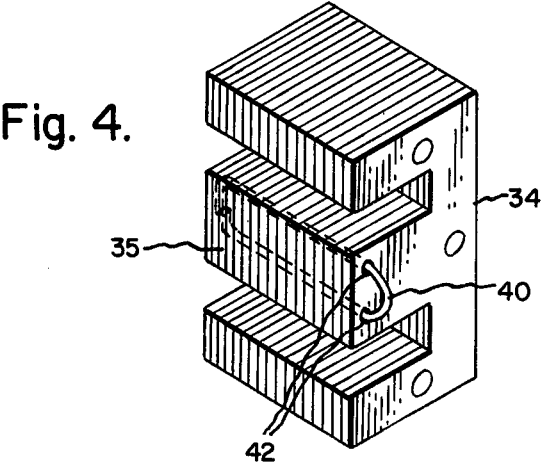
FIG. 4 is a perspective view of one possible core of the electromagnet of the braking unit.

FIGS. 1, 2, and 4 show an arrangement in which the shading coil 40 is positioned within the cavities formed in the electromagnet core 34. The core 34 in FIGS. 1, 2, and 3 can be seen to be an E-shaped core.

Figure 5:
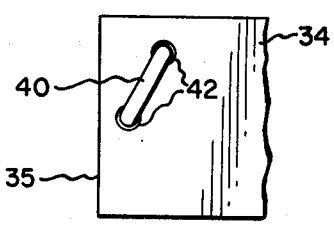
FIGS. 5, 6, and 7 show various alternate embodiments of the shading coil of the invention.
Figure 6:
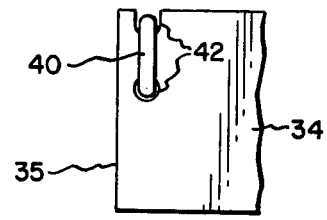
Figure 7:
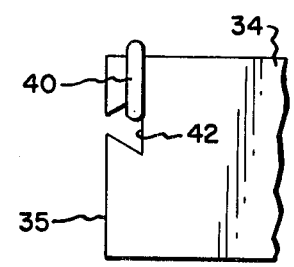

FIGS. 5, 6, and 7 show various alternative arrangements, each of which is characterized by the fact that at least a portion of the cavity 42 formed within the paramagnetic member is separated from the exposed surface or pole face 35 by an intervening portion of the paramagnetic member. The preferred embodiment is shown in FIG. 5 in which two parallel passages 42 are drilled through the paramagnetic material under the surface of the pole face 35 at different depths so that a shading coil 40 which passes successively through the two passages 42 would link a portion of the magnetic lines of force concentrated by the paramagnetic material. FIG. 6 shows a possible arrangement in which one of the cavities 42 is a channel formed in the side of the paramagnetic material. With this arrangement, the intervening core material between the side channel 42 and the pole face 35 tends to restrict the movement of the shading coil towards the pole face even if the other cavity 42 was also a channel or slot with vertical sides extending down into the material from the pole face. In FIG. 7, an arrangement is shown in which the cavity 42 is mortised so that at least a portion of the cavity has intervening material between the cavity and the pole face 35. When a loop of conductor forming the shading coil 40 is inserted in such a cavity 42 and tightly fastened to a loop around the outside of the pole, the configuration of the surfaces of the mortised cavity 42 effectively acts to prevent the movement of the shading coil 40 toward the pole surface 35 thereby creating a physical lock.

The above described invention and various embodiments thereof provide shading coil and core designs which achieve improved reliability, especially in the field, and which reduce the frequency of repair. Even when repair is required, the shading coil is easily disassembled and replaced by simply sliding a copper loop of wire into the cavities formed in the core or armature and by welding, soldering or fastening the wire by other means into a closed loop. Once properly assembled, the shading coil cannot fall out of the cavities after cyclic use of the brake since the shading coil is physically contained within holes of the laminated core instead of in slots with open surfaces. The shading coil of the present invention further has the significant advantage that it can be constructed of copper wire instead of special materials such as aluminum or brass. As will be recognized, the copper wire has a much lower current resistance so that the shading coil can be constructed of a copper wire having as much as a 40% smaller cross-section than prior art devices.

What is claimed is:

1. An improved hoist of the type having a motor for rotationally driving a shaft and an electrically operated brake unit for impeding the rotation of said shaft, said brake unit including a friction plate rotatably attached to said shaft, a rotationally stationary axially moveable brake plate adapted to engage said friction plate, a magnetically attractable armature fixed to said brake plate, means for forceably urging said brake plate and said friction plate into frictional contact with one another, and electromagnetic means having a paramagnetic core for attracting said armature and for holding said friction plate and said brake plate out of mutual contact against the force of said urging means, thereby permitting said friction plate and said shaft to rotate unimpeded when said electromagnetic means is actuated, the improvement comprising:

a. a paramagnetic core for concentrating magnetic lines of force, said core including a pole with a pole face and having a passage formed therewithin extending from one side of said pole to the other under said pole face, said passage being completely surrounded by the material of said pole; and b. a shading coil encircling a portion of said pole so as to link some of said concentrated magnetic lines of force, said shading coil comprising an electrical conductor forming a shorted circuit passing through said passage whereby said coil is maintained within said passage by the surrounding material of said pole.

2. The improvement of claim 1 wherein said passage is a first passage and said improvement further comprising a second passage formed within said core under said pole face completely surrounded by the material of said pole, said shading coil passing consecutively through said first and second passages to encircle the portion of said pole intermediate said first and second passages.

3. The improvement of claim 1 further including a channel formed in an exterior surface of said core for receiving therewithin one leg of said conductor circuit.

4. The improvement of claim 1 wherein said core includes plate-like laminations and wherein said passage formed within said core has an orientation perpendicular to said laminations.

5. The improvement as recited in claim 1 wherein said paramagnetic core is E-shaped with three poles and with said electrical coil surrounding the center arm of said E-shaped core, said brake unit further including an armature fastened to said brake plate and adjacent to said core whereby said electromagnetic means may attract said armature and said brake plate thereby releasing said brake.

6. An improved hoist of the type having a motor for rotationally driving a shaft and a brake unit for impeding the rotation of said shaft, said brake unit including an electrical coil for producing a magnetic field for disengaging said brake unit, the improvement comprising:
  a. a paramagnetic member associated with said coil for concentrating therewithin lines of force of said magnetic field, said member having an exposed surface whereby said member may act as a magnetic pole with said exposed surface acting as a pole face, said member further having a passage formed therewithin extending from one side of said pole to the other under said pole face, said passage being completely surrounded by the material of said paramagnetic member; and
  b. an electrical conductor forming a shorted circuit and linking a portion of the lines of force concentrated within said member, one leg of said conductor passing through said passage and being retained within said passage by said material of said paramagnetic member.

7. The improved hoist as recited in claim 6 further including a channel formed in an exterior surface of said member, said shading coil passing consecutively through said passage and said channel to encircle the portion of said pole intermediate said passage and said channel.

8. The improved hoist as recited in claim 6 wherein said paramagnetic member is centered in said coil to act as the core of an electromagnet.

9. The improved hoist as recited in claim 6 wherein said brake unit includes a friction plate and a brake plate and wherein said paramagnetic member is an armature fastened to said brake plate.

10. The improved hoist of claim 6 wherein said passage is a first passage and said improvement further comprising a second passage formed within said member under said pole face, said shading coil passing consecutively through said first and second passages to encircle the portion of said pole intermediate said first and second passages.

11. The improved hoist of claim 10 wherein said second passage is formed in said member at a different depth from said pole face than said first passage.

* * * * *